M. R. KONDOLF.
PROCESS AND APPARATUS FOR MAKING BOXES.
APPLICATION FILED DEC. 20, 1915.

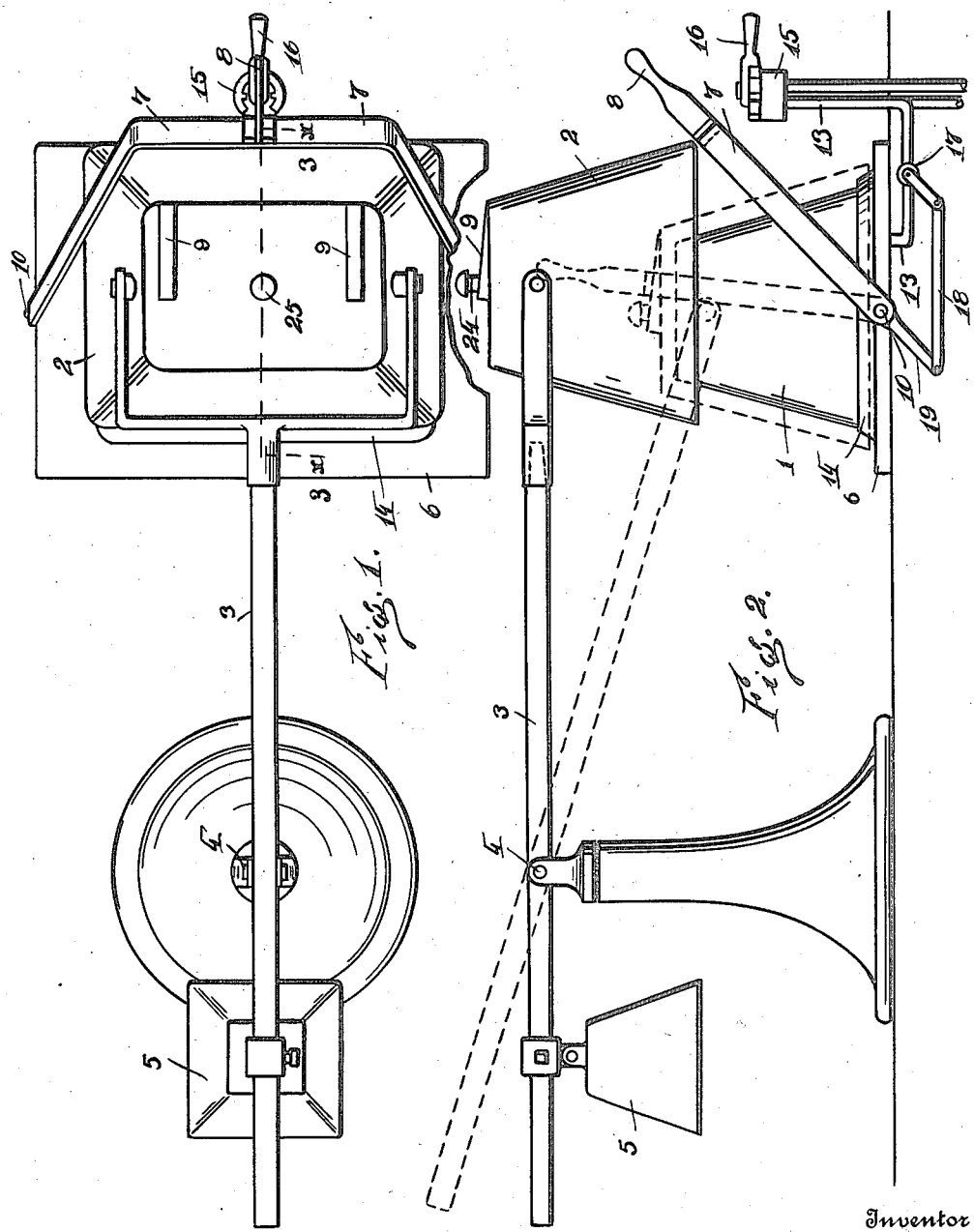

1,277,428.

Patented Sept. 3, 1918.
4 SHEETS—SHEET 2.

Witness
Eric Ischinger
Edna K. Booth.

Inventor
Mathias R. Kondolf
By Frank Keifer
Attorney

UNITED STATES PATENT OFFICE.

MATHIAS R. KONDOLF, OF ROCHESTER, NEW YORK, ASSIGNOR TO FRANK N. KONDOLF, OF NEW YORK, N. Y.

PROCESS AND APPARATUS FOR MAKING BOXES.

1,277,428.

Specification of Letters Patent.    Patented Sept. 3, 1918.

Application filed December 20, 1915. Serial No. 67,890.

*To all whom it may concern:*

Be it known that I, MATHIAS R. KONDOLF, a citizen of the United States, residing at Rochester, in the county of Monroe and State of New York, have invented certain new and useful Improvements in Processes and Apparatus for Making Boxes, of which the following is a specification.

The object of this invention is to provide a process and apparatus for joining the successive layers of which some types of boxes are made either in whole or in part.

This and other objects of the invention will be fully illustrated in the drawings, described in the specification and pointed out in the claims at the end thereof.

In the drawings,

Figure 1 is a top plan view of one form of the apparatus for making the box.

Fig. 2 is a side elevation of the apparatus shown in Fig. 1.

In the drawings like reference numerals indicate like parts.

Figure 3:
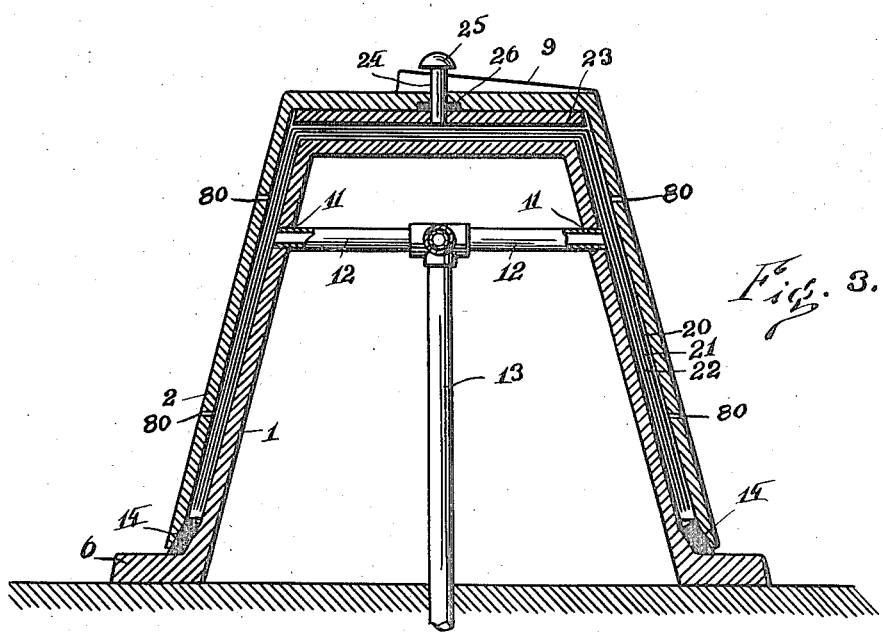
Fig. 3 is a vertical section on the line $3^x$—$3^x$ of Fig. 1.

In the drawings reference numeral 1 indicates the male die and 2 indicates the female die, between which dies the box is formed. The female die is carried on a lever 3 on which it is pivotally mounted, which lever is fulcrumed at 4 and is provided on its opposite end with a counter-balance 5 which enables the operator to more easily lift the female die. The male die is mounted on a base 6 on which is pivotally mounted a yoke 7 having a handle 8. On top of the female die are placed the cams 9 which may be either straight or curved and in the latter case they are slightly eccentric to the pivot 10 on which the yoke 7 is pivotally mounted. The female die fits down over the male die 1 and the yoke 7 is then swung up over the female die, the top of the yoke engaging with the cams 9 forcing the female die down snugly into place, the yoke 7 stopping in the position shown by dotted lines in Fig. 2. The inside of the male die is preferably hollow. The male die is provided with suitable openings 11 through which pass tubes or pipes 12 connected with a supply pipe 13 through which compressed air is passed into the opening between the two dies. To prevent the escape of air between the openings of the two dies a gasket 14 is provided which surrounds the base of the male die with which the female die makes close air tight contact. This air supply is regulated by the valve 15, operated by a handle 16. The valve 15 is preferably a three way valve through which the air can be admitted, exhausted and held. In the supply pipe 13 is provided a valve 17 connected by a link 18 with an extension 19 of the yoke 7. This valve is normally closed but when the yoke reaches the dotted line position shown in Fig. 2, this valve will be open permitting air to flow into the space between the dies or out therefrom on the operation of the valve 15.

In Fig. 3 I have shown a box in the process of making. In this figure I have shown three layers of material 20, 21 and 22, each layer being composed of paper or any other material suitable for making the box. The adjacent sides of these layers of material are coated with an adhesive so that the layers will be properly fastened together. Two or more of such layers of material with an adhesive coating between them are placed over the male die. The female die is then placed in position over the male die so as to include the layers of material and is locked in place between the yoke 7. The air pressure is then turned on by the valve 15. The air will flow through the pipe 13 and through the branch pipe 12 into the space between the dies 1 and 2. As the compressed air is confined in this space by the gasket 14 it will press all of the layers of material outwardly against the female die or it will press them together against each other by the air pressure acting on both sides thereof.

After the box is finished the female die is raised and for the purpose of removing the finished box from the female die a stripper plate 23 is provided in the top of the die. This stripper plate 23 has a pin 24 which passes through the top of the die ending in a head 25. The pin 24 is surrounded by a flat gasket 26 that is pressed around the pin when the stripper plate 23 is raised by the air pressure, forming an air tight joint which prevents the escape of compressed air. After the box is formed the stripper plate 23 is pushed down by the pin 24 for the purpose of releasing the finished box from the female die. This may be done manually or it may be done by swinging the female die under an overhead arm 27 against which it may be raised causing relative movement between the stripper plate and the die. For this purpose a guide 81 is provided along which the lever 3 may travel up and sidewise. On this guide is supported the cam 27 which is set at an angle to the upper part of the guide. When the lever 3 moves sidewise, the pin 25 engages under the cam 27 and is forced down by it.

Fresh material may then be placed on the male die and the female die may then be placed on top thereof and the above operation may then be repeated.

It will be understood that the position of the male and female dies may be inverted, in which case the male die will be on top and will act as a cover and can be even reduced to the form of a mere cover part and the details of such modifications will now be more fully described.

Figure 5:
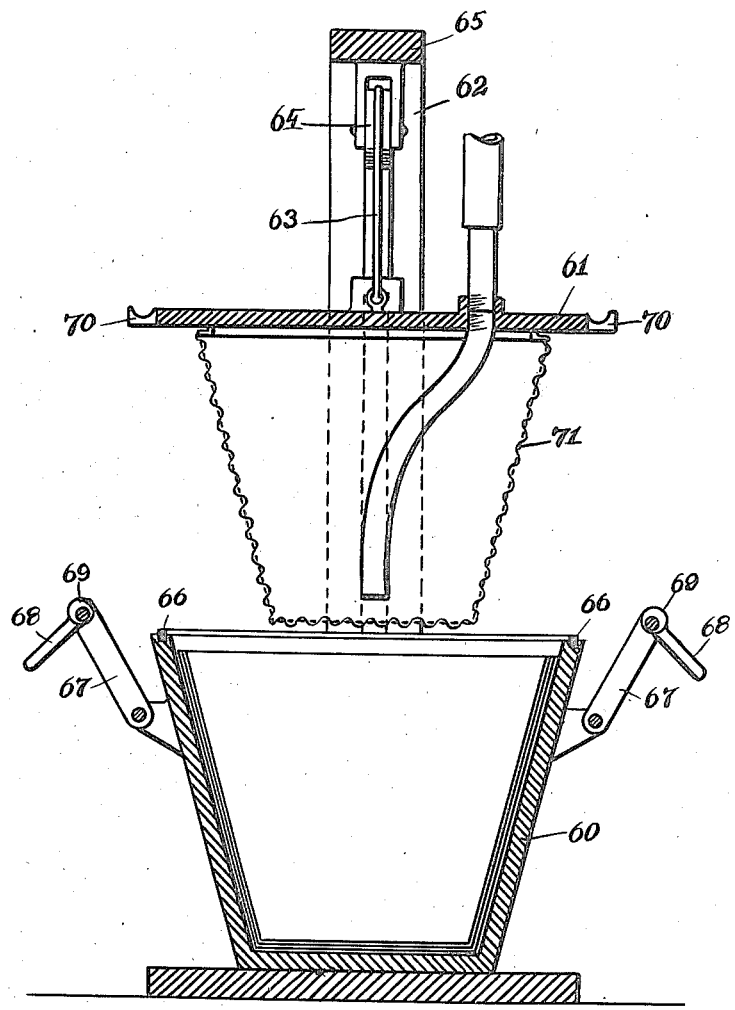
Fig. 5 is a vertical section through a modified form of apparatus for making boxes according to my process.

In Fig. 5 I have shown another form of apparatus in which 60 is the female die and 61 is a cover plate. This cover plate is mounted to slide between uprights, one of which is shown at 62 and is raised by means of a cord 63 which passes over a pulley 64 in the top of the frame 65 and by which the cover plate may be conveniently raised and lowered. A gasket 66 is provided on top of the female die which makes an air tight joint with the cover plate. Links 67 are pivotally connected to the female die, on which links are carried handles 68 and eccentrics 69 which engage with suitable recesses in the lugs 70 projecting from each side of the cover plate. Supported from the cover plate is a screen 71 which fits loosely within the layers of material in the female die and holds them sufficiently in place. When the cover plate is fastened in place compressed air is admitted, which compressed air acts directly on the several layers of material compressing them against the female die, causing the layers to adhere to each other, it being understood that the several layers have their sides coated with a suitable adhesive. If desired any of these female dies may be provided with a series of perforations which will allow the escape of any air that may be entrapped between the material and the female die, permitting the material to lie snugly against the female die. Such perforations are indicated at 80 in Fig. 3.

Figure 4:
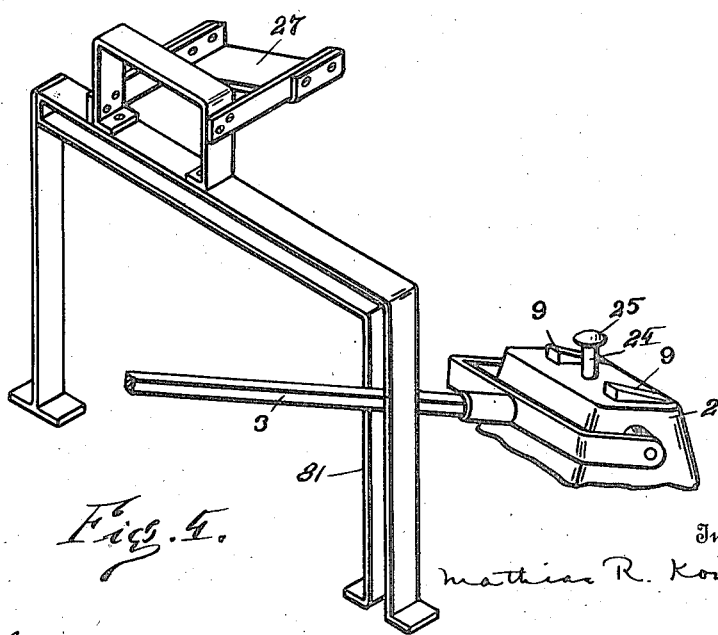
Fig. 4 is a detail perspective view of a guide and cam for ejecting the box after it has been pressed together.
Figure 6:
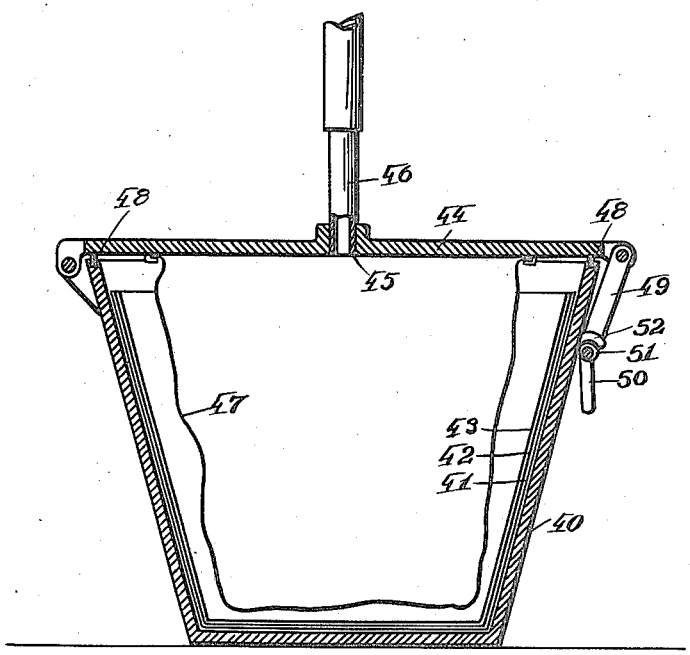
Fig. 6 is a vertical section through still another form of apparatus.

In Fig. 6 I have shown still another form of apparatus. Here the female die 40 is shown having three layers of material 41 and 42 and 43 therein. On top of the female die 40 is a cover plate 44 having an opening 45 therein which is connected with a tube 46 by which compressed air is furnished to the opening in the die. Connected to the underside of the cover plate 44 is a flexible sack 47 which loosely fits the form of the box that is to be made and is preferably somewhat elastic, or if made of inelastic material, must be somewhat folded. When the cover is swung down into place this sack hangs loosely inside of the layers of material that are to be joined into the box. The gasket 48 is provided between the cover and the female die. The link 49 is provided connected to the cover, to the bottom of which link is connected a handle 50 having an eccentric 51 thereon which engages under a suitable lug 52 by which the cover may be clamped tightly in place on top of the die. After the parts are arranged, as shown in Fig. 4, compressed air is admitted through the pipe 46, which compressed air forces the sack 47 out against the layers of material and compresses them against the female die, causing them to adhere together.

While I have shown the female die tapering and even some of the male dies tapering as well, it will be understood that I do not wish to limit myself to such a form as a form having parallel sides may be used instead or any other suitable form may be used for the dies that will permit the insertion of the stock and the removal of the finished box therefrom.

It will also be understood that the layers from which the finished box is made by my process and apparatus may each be made up in the form of separate strips partially lapped or from blanks cut and scored and folded or bent or assembled to form box sections which will approximate the form of the finished box or the form of the dies.

I claim:

1. An apparatus for making boxes comprising a female die adapted to receive a plurality of layers of box making material loosely assembled, with adhesive between them, a closure for said female die, openings therein by which compressed air may be admitted to said female die into direct contact with the layers of box making material to compress them.

2. An apparatus for making boxes comprising a female die adapted to receive a plurality of layers of box making material loosely assembled with adhesive between them, a male die adapted to fit in said female die, a gasket closing the opening between said dies, means for forcing air between said dies into direct contact with the layers of box making material to compress them.

3. An apparatus for making boxes comprising a female die adapted to receive a plurality of layers of box making material loosely assembled with adhesive between them, a male die adapted to fit in said female die, a gasket closing the opening between said dies, means for forcing air between said dies into direct contact with the layers of box making material to compress them, a stripper plate at the bottom of the female die, a pin connected thereto and extending through the die, by which pin said plate may be moved to disengage the box from the die.

4. An apparatus for making boxes comprising a female die adapted to receive a plurality of layers of box making material loosely assembled with adhesive between them, a male die adapted to fit in said female die, a gasket closing the opening between said dies, means for forcing air between said dies into direct contact with the layers of box making material to compress them, a stripper plate at the bottom of the female die, a pin connected thereto and extending through the die, by which pin said plate may be moved to disengage the box from the die, a guide for controlling the movement of the female die, a cam positioned thereon for engaging with and moving the pin and stripper.

5. The method of making boxes comprising the loose assembling of a plurality of layers thereof with an adhesive between them in a female die and forcing the layers together by compressed air applied in direct contact therewith.

6. An apparatus for making boxes comprising a female die adapted to receive a plurality of layers of box making material loosely assembled, with adhesive between them, a closure for said female die, openings therein by which compressed air may be admitted to said female die into direct contact with the layers of box making material to compress them, small openings in said female die to permit the escape of any air that may be trapped between the layers of material and the female die.

7. The method of making boxes comprising the loose assembling of a plurality of layers with an adhesive between them in a closed receptacle and forcing said layers together by compressed air, applied in direct contact to said layers.

8. The method of making boxes comprising the loose assembling of a plurality of layers with an adhesive between them in a closed receptacle and forcing said layers together by a fluid medium under pressure, said fluid medium being applied into direct contact with the layers.

9. The method of making boxes comprising the loose assembling of a plurality of layers in a closed receptacle and forcing said layers together by a fluid medium under pressure, said fluid medium being applied into direct contact with the layers.

In testimony whereof I affix my signature.

MATHIAS R. KONDOLF.